(12) United States Patent
Wiedner et al.

(10) Patent No.: US 8,734,073 B2
(45) Date of Patent: May 27, 2014

(54) FASTENING ARRANGEMENT

(75) Inventors: Christoph Wiedner, Feldkirch (AT);
Manuel Mueller, Vilters (CH)

(73) Assignee: Hilti Aktiengesellschaft, Schaan (LI)

( * ) Notice: Subject to any disclaimer, the term of this patent is extended or adjusted under 35 U.S.C. 154(b) by 121 days.

(21) Appl. No.: 13/414,280

(22) Filed: Mar. 7, 2012

(65) Prior Publication Data

US 2012/0230799 A1    Sep. 13, 2012

(30) Foreign Application Priority Data

Mar. 11, 2011 (DE) .................... 10 2011 005 405

(51) Int. Cl.
*F16B 39/22* (2006.01)

(52) U.S. Cl.
USPC .......................................... 411/305; 411/433

(58) Field of Classification Search
USPC .............. 411/305, 306, 432–434, 935, 935.1; 248/74.1, 74.2
See application file for complete search history.

(56) References Cited

U.S. PATENT DOCUMENTS

| 1,116,095 | A | * | 11/1914 | Mellis | 411/237 |
|---|---|---|---|---|---|
| 1,303,784 | A | * | 5/1919 | Emery | 411/143 |
| 1,329,126 | A | * | 1/1920 | Leming | 138/89.4 |
| 1,887,963 | A | * | 11/1932 | Stafford | 411/433 |
| 1,915,588 | A | * | 6/1933 | Arrington | 411/433 |
| 2,448,902 | A | * | 9/1948 | McKenzie | 411/265 |
| 2,449,846 | A | * | 9/1948 | Gilman | 411/237 |
| 2,664,023 | A | * | 12/1953 | Mugford | 411/433 |
| 2,789,458 | A | * | 4/1957 | Skeisvoll | 411/433 |
| 3,058,386 | A | * | 10/1962 | Morrow | 411/511 |
| 3,352,341 | A |   | 11/1967 | Schertz |  |
| 4,083,288 | A |   | 4/1978 | Williams |  |
| 4,462,731 | A | * | 7/1984 | Rovinsky et al. | 411/433 |
| 4,850,777 | A | * | 7/1989 | Lawrence et al. | 411/433 |
| 5,032,048 | A |   | 7/1991 | Walton et al. |  |
| 5,377,395 | A | * | 1/1995 | Maier et al. | 27/2 |

FOREIGN PATENT DOCUMENTS

| DE | 40 106 A1 | 7/1965 |
|---|---|---|
| DE | 25 33 696 A1 | 2/1976 |
| DE | 19 72 740 U | 11/1976 |
| DE | 690 00 653 T2 | 5/1993 |
| DE | 19904293 A | 8/2000 |
| DE | 10 2006 035 404 B4 | 5/2008 |
| EP | 1016797 A2 | 7/2000 |
| EP | 1024303 A2 | 8/2000 |
| GB | 1455549 | 7/1975 |

OTHER PUBLICATIONS

Thomas & Betts Corporation:"Trapnut™ Strut Fastener," Memphis, TN, USA, 2006, pp. 1 to 4, http://www.tnb.com/shared/docs/kd_1_g_trapnut.pdf.
Cooper US, Inc.:"Introducing the new Bussnut™" Houston, Texas, pp. 1-2, 2011 http://www.cooperbline.com/pdf/Flyers/BA193S.pdf.

* cited by examiner

*Primary Examiner* — Gary Estremsky
(74) *Attorney, Agent, or Firm* — Davidson, Davidson & Kappel, LLC

(57) ABSTRACT

A fastening arrangement, including a quick-action nut that has two nut parts. The nut parts each have a groove to receive a threaded rod, and including a locking element with at least one passage opening for securing the quick-action nut to the threaded rod. In the passage opening, the locking element has a locking surface for pressing the nut parts against the threaded rod as well as a centering surface for centering the threaded rod in the passage opening. In the passage opening, the locking element has a transition surface that adjoins the locking surface and the centering surface, and that runs between the locking surface and the centering surface.

17 Claims, 2 Drawing Sheets

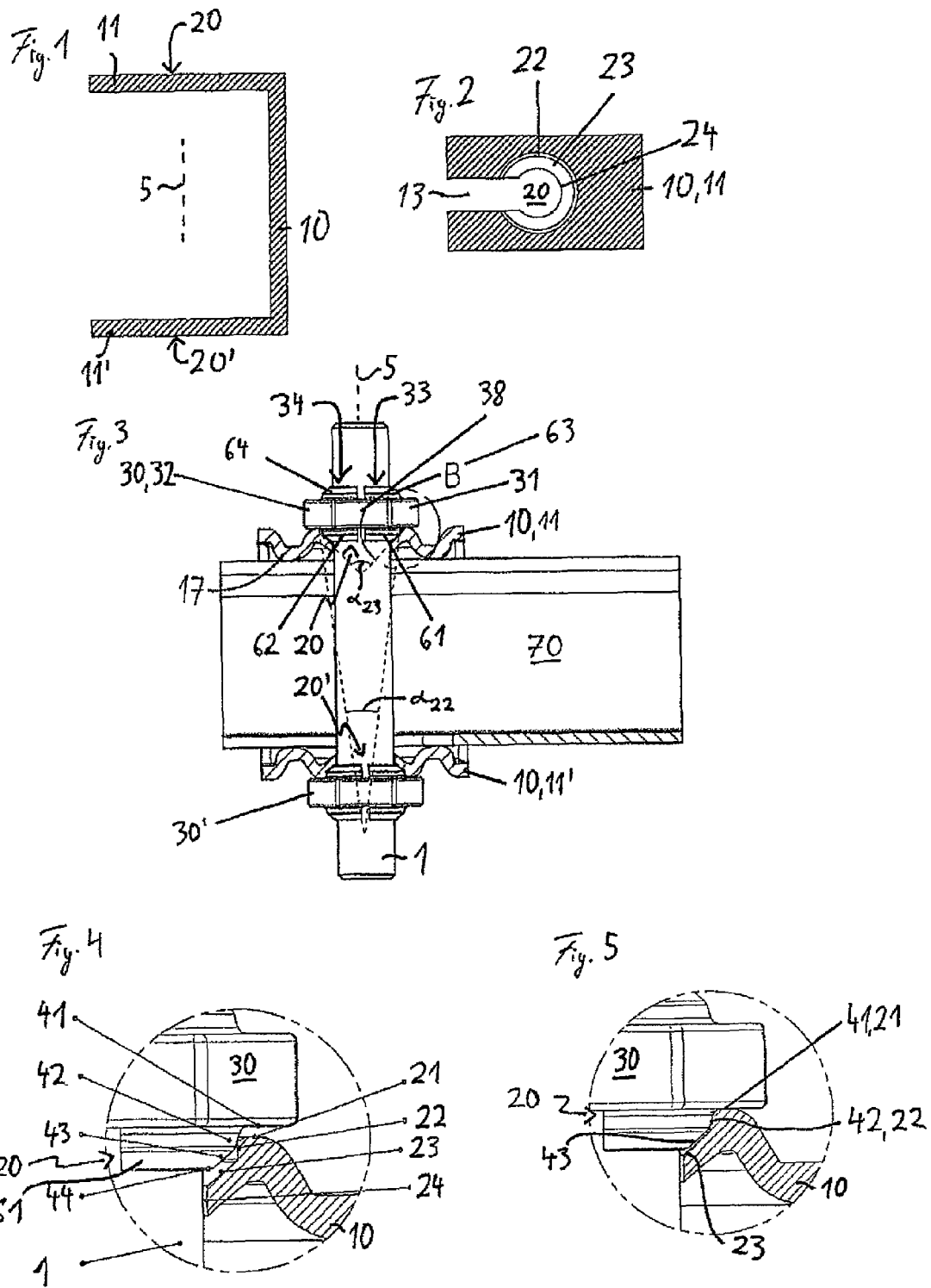

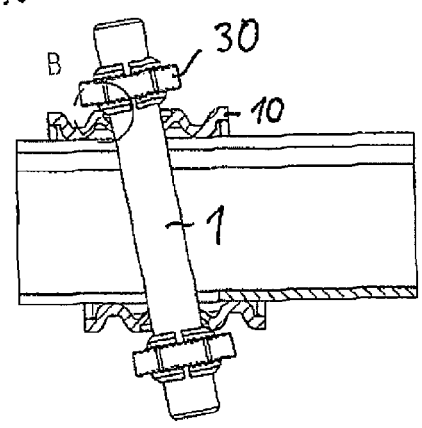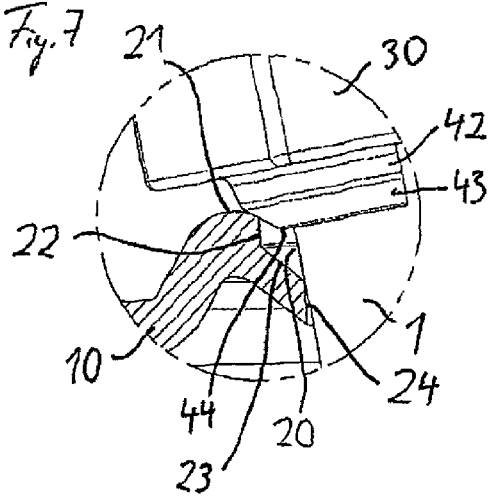

FASTENING ARRANGEMENT

This claims the benefit of German Patent Application DE 10 2011 005 405.7, filed Mar. 11, 2011 and hereby incorporated by reference herein.

The invention relates to a fastening arrangement, comprising a quick-action nut that has two nut parts, each with a groove to receive a threaded rod, and comprising a locking element with at least one passage opening for securing the quick-action nut to the threaded rod, whereby, in the passage opening, the locking element has a locking surface for pressing the nut parts against the threaded rod as well as a centering surface for centering the threaded rod in the passage opening.

BACKGROUND

In the realm of installation engineering, for example, quick-action nuts consisting of several parts that are joined together and secured on the threaded rod are known as an alternative to standard nuts. Their advantage lies in the fact that they do not have to be twisted on from the end of the threaded rod, but rather, that they can be fastened directly to any desired place on the threaded rod. In particular, they can be employed in the production of multilayered suspended structures as well as for subsequently mounting an additional installation plane in an existing suspended structure.

European patent application EP 1 016 797 A2, for example, discloses a multi-part quick-action nut. This patent application teaches the approach of using an almost completely split standard nut as the quick-action nut, which can be opened by bending the web that remains after the nut is split, thus causing plastic deformation in the vicinity of the web. After the nut has been opened, it can be held over the threaded rod in any desired place, so that the nut parts can then be bent back plastically.

Another multi-part quick-action nut is known, for instance, from German patent DE 10 2006 035 404 B4. According to this patent, two completely separate nut parts are resiliently joined together by a spring.

In order to lock multi-part quick-action nuts, there is often a need for a locking element having a passage opening (e.g. a circular hole in the rail or in the joining part) which encircles the split nut, so that it is protected against accidental opening under load. Such a locking element is shown, for example, in U.S. Pat. No. 4,083,288 A. According to this patent, the locking element is configured in the form of a disk and it has a passage opening with a cylindrical centering surface through which the threaded rod can be inserted, as well as a conical locking surface that locks both nut parts.

Another nut that can be quickly fitted is disclosed in German patent DE 19904293 A. At http://www.tnb.com/shared/docs/kd_1_g_trapnut.pdf, a four-piece arrangement consisting of two split sheet metal plates having half-threads, a rivet and a locking pin is described. The arrangement is held in the open state at any desired place on the threaded rod and closed like a pair of scissors. Then, the locking pin is pressed with pliers, the arrangement is rotated into the desired position and firmly tightened with a wrench. http://www.cooperbline.com/pdf/Flyers/BA193S.pdf describes an approach involving a nut and a plate which are pressed into each other but which can nevertheless be rotated with respect to each other, and which each have a half-thread and an opening for the threaded rod. The arrangement is held in the open state—that is to say, when the openings on the nut and on the plate are oriented in the same direction—at any desired place on the threaded rod. Then the arrangement is closed and firmly tightened by turning the nut and the plate.

SUMMARY OF THE INVENTION

It is an object of the present invention to provide a fastening arrangement comprising a multi-part quick-action nut and a locking element, which is easy to handle, entails low production costs and is particularly reliable in actual applications.

A fastening arrangement according to the invention is characterized in that, in the passage opening, the locking element has a transition surface that adjoins the locking surface and the centering surface, and that runs between the locking surface and the centering surface.

A basic idea of the invention is to provide the passage opening with an additional functional surface, namely, the transition surface, that is positioned in the radial direction and/or in the axial direction (in each case relative to the longitudinal axis of the passage opening and/or to the longitudinal axis of the threaded rod) between the centering surface and the locking surface. It has been recognized with the invention that both nut pails can be secured very effectively when the locking surface is configured to have a very small opening angle, in other words, so as to be almost cylindrical. In this case, the locking surface acts almost radially onto the nut parts, so as to attain an especially good pressing effect with the threaded rod. Furthermore, it has been recognized with the invention that it is advantageous for the passage opening to surround the threaded rod as closely as possible to the centering surface since this ensures that the nut can be reliably pulled into the passage opening without jamming and/or becoming lodged on the edge of the passage opening. After all, the locking element can usually only function as envisaged when the nut is situated in the passage opening, but not when the nut is lodged on the edge of the passage opening. For this reason, the threaded rod and thus the nut should be properly centered. The transition surface provided according to the invention now makes it possible to combine the two above-mentioned effects to advantage. Since, according to the invention, the locking surface and the centering surface are not adjacent to each other but rather are separated from each other by the transition surface, on the one hand, the centering surface can be moved very close to the threaded rod so that the nut is pulled in very reliably and, on the other hand, the locking surface can be configured to be steep, that is to say, it has a small opening angle, thus accounting for a very good pressing effect.

According to the invention, the passage opening in the locking element is adapted to the geometry of the nut, which ensures that the nut is secured in the locking element. The grooves in the two nut parts advantageously each have at least one thread profile that matches the thread of the threaded rod. The threaded rod can also be configured, for instance, so as to be bolt-like and so as to have at least one head. According to the invention, the two nut parts can be moved relative to each other so that the nut can be opened in order to be radially slid onto the threaded rod and subsequently closed again. The threaded rod can be considered as an integral part of the fastening arrangement according to the invention, or else as a separate part.

It is particularly preferred for the locking surface, the transition surface and/or the centering surface to be configured so as to be in the form of ring segments or a ring. In this manner, it is ensured that force can be introduced very effectively into the nut so that the threaded rod can be positioned very effectively. Insofar as the locking element has a slit that extends all the way into the passage opening for purposes of inserting the threaded rod into the passage opening, the above-mentioned surfaces are advantageously configured so as to be in the form of a ring segment that is interrupted at the slit. If there is no slit, the surfaces can be configured like a ring.

It is likewise in accordance with the invention that the locking surface has a smaller opening angle than the transition surface, at least in certain areas. In this manner, the introduction of force can be further improved. The term "opening angle" particularly refers to an angle enclosed by two areas of the surfaces in question that are radially opposite (relative to the longitudinal axis of the passage opening). An edge can be formed between the locking surface and the transition surface. The two surfaces, however, can also make a continuous transition into each other. For instance, the opening angle of the locking surface can be smaller than 20°, smaller than 10° or smaller than 5°. In particular, it can at least amount to approximately 0°. For example, the opening angle of the transition surface can be between 60° and 120°.

In an advantageous embodiment of the invention, the quick-action nut has at least one stop surface that limits the axial insertion of the quick-action nut into the passage opening. This can ensure that the nut is reliably secured, even in the case of very large axial loads. In one embodiment whose structure is very simple, the stop surface can be configured, for example, as a radial plane that surrounds the locking surface and that is in contact with the locking element when the nut has been properly accommodated in the locking element.

It is especially preferred for the transition surface to be at a distance from the nut parts when the quick-action nut is in contact with the stop surface on the locking element and/or when the locking surface is pressing the nut parts onto the threaded rod. According to this embodiment, when the arrangement according to the invention is employed as intended, only the virtually cylindrical locking surface acts upon the nut halves, but not the transition surface, which is configured with a larger opening angle. This ensures that even when the nut has been completely pulled into the passage opening, the locking effect of the locking element acts primarily in the radial direction, while the axial component remains small, so that an excellent locking effect is retained. According to this embodiment, the stop surface is positioned on the nut in such a way that it prevents contact of the transition surface with the nut, especially with the collar of the nut, when the locking surface secures the nut parts on the threaded rod.

It is likewise advantageous for the nut parts to each have at least one collar for engaging with the locking surface. Such a collar, which is advantageously arranged on the contact surface of the nut, provides an excellent pressing effect of the locking surface and thus an excellent locking effect in the case of compact dimensions. In order to attain a highly uniform introduction of force, the collars can each be configured in the form of ring segments.

If a collar is provided, it is particularly advantageous for the at least one collar to have a contact surface to establish contact with the locking surface of the locking element, as well as for it to have a positioning surface arranged at an angle to the contact surface. The positioning surface here has a larger opening angle than that of the contact surface, so that the positioning surface can serve as an insertion aid when the nut is being inserted into the passage opening. The contact surface and the positioning surface are advantageously configured in the form of ring segments, especially conical segments.

Another advantageous refinement consists of the fact that the nut parts each have two collars that are arranged on opposite sides of the appertaining nut part. According to this embodiment, a top collar and a bottom collar on the opposite side are provided on each nut part. This ensures that the nut can be reliably secured independently of the mounting direction, so that the technician does not have to pay attention to the mounting direction, which accounts for very fast installation.

Especially preferably, the locking element has a slit that extends into the passage opening so that the threaded rod can be inserted into the passage opening from the outside of the locking element. The configuration with such a slit dispenses with the need for sliding the locking element along the threaded rod, and the locking element can be inserted anywhere on the threaded rod, even in those cases when there are already other items installed along the threaded rod.

In a particularly simple embodiment, the locking element can be configured in the form of a plate, for example, as a washer. The locking element can also have several passage openings. For instance, the locking element can have at least two passage openings configured according to the invention which are aligned with each other, in order to allow the threaded rod to pass through the two passage openings. In this case, two quick-action nuts can establish a connection between the threaded rod and the locking element, which can be subjected to tension as well as pressure. The locking element can preferably be configured so as to be U-shaped, so that it can grip around a profile rail, whereby then a passage opening with a quick-action nut can be arranged in each of the two opposite legs of the locking element.

Accordingly, it is particularly advantageous for the locking element to have another passage opening to secure an additional quick-action nut with two nut parts on the threaded rod, whereby the passage opening and the additional passage opening are preferably aligned with each other. Especially so that the same type of nut can be used for both passage openings, it can be provided that the locking surfaces, the centering surfaces and/or the transition surfaces of the two passage openings are dimensioned so as to be at least approximately identical. In a practical manner, the contact surfaces of the two passage openings that form the narrowest cross section face each other, so that both passage openings widen towards the outside and/or the two passage openings are configured so as to be mirror-symmetrical to each other. This accounts for a very easy installation of the two nuts on the outside of the locking element.

An especially simple installation can be ensured in that both nut parts are joined to each other in an articulated manner, preferably by means of an articulated axis that runs along the nuts. For this purpose, an articulated strut, for example, can be provided, which joins the two nut parts to each other and which can be plastically deformed. Preferably, this articulated strut is dimensioned in such a way that the nut parts can be manually pressed onto the threaded rod and closed and so that, at the same time, it is possible to re-use them.

The invention also encompasses a fastening arrangement according to the invention, comprising a threaded rod that passes through the passage opening, whereby the locking surface of the locking element presses both nut parts radially against the threaded rod.

BRIEF DESCRIPTION OF THE DRAWINGS

The invention will be explained in greater detail below on the basis of preferred embodiments that are schematically depicted in the figures. The figures show the following:

FIG. 1 a rough schematic side view of a locking element of a fastening arrangement according to the invention;

FIG. 2 a rough schematic top view of the locking element from FIG. 1;

FIG. 3 a partial sectional front view of a fastening arrangement with the locking element from FIG. 1;

FIG. 4 the detailed view B from FIG. 3, in which the nut is only partially pulled in;

FIG. 5 the detailed view B from FIG. 3, in which the nut is completely pulled in; and FIGS. 6, 7 views analogous to those of FIGS. 3 and 4 in order to illustrate the effect of the positioning surface of the nut collar in the case of a threaded rod running at a slant.

DETAILED DESCRIPTION

FIGS. 1 to 5 show an embodiment of a fastening arrangement according to the invention, whereby, for the sake of clarity, FIGS. 1 and 2 depict fewer details than the other figures. As can especially be seen in FIGS. 1 and 3, the fastening arrangement has a locking element 10 which, in the embodiment shown, is configured as a U-shaped bracket having two legs 11 and 11' in each of which a passage opening 20 and 20', respectively, is formed for a threaded rod 1. As shown only in FIG. 3, the legs 11 and 11' of the locking element 10 grip around a rail 70. The two passage openings 20 and 20' are arranged so as to be aligned in order to receive one and the same threaded rod 1, thus having a shared longitudinal axis 5 that is only sketched in the figures. As shown, among other things in FIG. 3, the two legs 11 and 11' and/or the two passage openings 20 and 20' are configured so as to be mirror-symmetrical relative to a mirror plane that runs perpendicular to the longitudinal axis 5. For this reason, only the first leg 11 and the first passage opening 20 will be described in detail below. The corresponding second elements are configured analogously.

As shown in FIG. 2, the leg 11 of the locking element 10 has a slit 13 that extends from the outside of the locking element 10 into the passage opening 20. This slit allows the locking element 10 to be slid onto the threaded rod 1 radially to the longitudinal axis 5, whereby the threaded rod 1 extends into the passage opening 20 through the slit 13. As can be seen in FIG. 3, the locking element 10 is provided with beads 17 in the area of the passage opening 20 for reinforcement purposes.

As shown in FIGS. 3 to 5, the fastening arrangement also has two quick-action nuts 30 and 30', whereby the quick-action nut 30 is arranged in the first passage opening 20 while the second quick-action nut 30' is arranged in the second passage opening 20'. The two quick-action nuts 30 and 30' are configured essentially identically, so that only the first quick-action nut 30 is described in detail below.

As especially shown in FIG. 3, the quick-action nut 30—which is configured so as to be polygonal on the outside, for example, hexagonal—has two nut parts 31 and 32 in each of which a groove 33 and 34, respectively, is provided. The grooves 33 and 34 serve to receive the threaded rod 1 and they each have an internal threaded section that matches the threaded rod 1. The two nut parts 31 and 32 are pivotably joined to each other by means of a plastically deformable strut 38. The plastically deformable strut 38 makes it possible for the two nut parts 31, 32 to be bent together from a spread-open position—in which they can be slid radially onto the threaded rod 1—in such a way that their internal threaded sections come to form a positive fit with the external thread of the threaded rod 1, thus securing the nut 30 along the threaded rod 1.

In order to prevent the two nut parts 31 and 32 from unintentionally spreading open again, thus releasing the threaded rod 1, the nut 30 is inserted partially into the passage opening 20, for example, by tightening the nut 30 or by pulling on the threaded rod 1. As will be elaborated upon in greater detail below, the nut parts 31 and 32 are radially secured in the passage opening 20 by the wall of the locking element 10, so that, as a rule, it can no longer spread open. In order to make it possible to insert the over-dimensioned nut 30 into the passage opening 20, the underside of the nut parts 31 and 32 is provided with a collar 61 and 62, respectively, in the form of ring segments, whereby these collars 61 and 62 can be accommodated by the passage opening 20.

In order to allow the nut 30 to be inserted from both sides into the passage opening 20, the nut 30 also has collars 63 and 64 on its upper side. These upper collars 63 and 64 are configured mirror-symmetrical to the lower collars 61 and 62. For this reason, only the lower collars 61 and 62 will be explained in detail below.

Especially as can be seen in FIG. 4, the radially external wall of the collars 61, 62 (see also FIG. 3) have two areas that are slanted differently, namely, the contact surface 42 and the positioning surface 43, whereby the positioning surface 43 adjoins the contact surface 42 and it is situated axially further to the outside than the contact surface 42. On the side of the contact surface 42 facing away from the positioning surface 43, the contact surface 42 adjoins a stop surface 41 that runs essentially radially. This stop surface 41 limits an axial movement of the nut 30—which is held in the passage opening 20—relative to the locking element 10. In particular, the nut 30, which is arranged coaxially with respect to the passage opening 20, can be pushed axially into the passage opening 20 until, as shown in FIG. 5, the stop surface 41 comes to rest against a contact surface 21 of the locking element 10 that surrounds the passage opening 20.

The contact surface 42 is provided for purposes of establishing contact with a locking surface 22 of the locking element 10. This contact surface 42 exhibits only a slight deviation from the lengthwise direction of the grooves 33, 34, that is to say, from the direction of the longitudinal axis 5 of the threaded rod 1 that has been inserted therein, so that, due to a wedge effect on the locking surface 22 of the locking element 10, a large radial force can act upon the nut 30 and firmly press the nut parts 31, 32 onto the threaded rod 1. In this context, the diameter of the locking surface 22 and of the contact surface 42 can preferably be coordinated with each other in such a way that these surfaces 22 and 42 come into contact with each other when the nut 30 is screwed in and the locking element 10 even becomes slightly widened at the upper edge of the locking surface 22, until further insertion of the nut 30 is stopped when the stop surface 41 comes to rest on the contact surface 21, which can be recognized by a marked rise in the tightening torque.

In comparison to the contact surface 42, the positioning surface 43 exhibits a greater deviation from the lengthwise direction of the grooves 33, 34, that is to say, from the direction of the longitudinal axis 5 of the threaded rod 1, thus having a larger opening angle. As can especially be seen in FIGS. 6 and 7, the positioning surface 43 makes it easier to insert the nut 30 into the passage opening 20, particularly when the threaded rod 1 is tilted with respect to the passage opening 20.

As a rule, due to technical reasons during manufacturing, the positioning surface 43 cannot be prevented from tapering in a rounded end, the collar crown 44, as is especially shown in FIG. 4. This collar crown 44 has the potential of posing the risk of a malfunction if it comes to rest on the contact surface 21 of the locking element 10 when the threaded rod 1 is tilted and/or not centered. In this case, the non-slanted tip of the collar crown 44 would become lodged on the likewise non-slanted contact surface 21 of the locking element 10, so that the nut 30 would not allow itself to be inserted into the passage opening 20 of the locking element 10. This, in turn, can cause the nut parts 31, 32 to be insufficiently secured before spreading under load, which could case a failure under certain circumstances.

In order to avoid such a malfunction, in the passage opening 20, the locking element 10, especially as shown in FIG. 4, has not only the locking surface 22 but also a centering surface 24, which is configured coaxially to the locking surface 22 but which has a smaller diameter than the locking surface 22. The function of this cylindrical centering surface 24 is to center the threaded rod 1 together with the nut 30 positioned on it so precisely with respect to the locking surface 22 that, even if the threaded rod 1 is at a slant, it is geometrically impossible for the collar crown 44 to become lodged on the contact surface 21 of the locking element 10 (see FIGS. 6 and 7). Consequently, when tightened, the nut 30 is necessarily inserted into the passage opening 20, while the contact surface 42 and the locking surface 22 are correctly positioned with respect to each other and thus the nut parts 31, 32 are reliably prevented from inadvertently opening.

Especially as shown in FIG. 4, between the centering surface 24 and the locking surface 22 of the locking element 10, there is a transition surface 23, whereby the opening angle $\alpha_{23}$ of the transition surface 23 is greater than the opening angle $\alpha_{22}$ of the locking surface 22, as indicated in FIG. 3. This transition surface 23 allows the centering surface 24 to be configured with a small diameter, along with a steep locking surface 22, thus bringing about an excellent centering effect while also attaining a good locking effect.

As shown in FIG. 5, the nut 30 and the locking element 10 are dimensioned in such a way that, in the completely tightened state, that is to say, when the stop surface 41 is resting on the contact surface 21, on the one hand, the positioning surface 43 is at a distance from the locking element 10 and, on the other hand, the transition surface 23 is at a distance from the nut 30. As a result, it is ensured that, even in this state, the two nut parts 31, 32 are secured exclusively due to the contact between the locking surface 22 and the contact surface 42.

The surfaces 22, 23, 42 and/or 43 are preferably in the form of a ring or ring segment, especially in the form of a cone or a cone segment.

What is claimed is:

1. A fastening arrangement comprising:
    a quick-action nut having two nut parts, the nut parts each having a groove to receive a threaded rod;
    a locking element, the locking element having at least one passage opening for securing the quick-action nut to the threaded rod, the locking element, in the passage opening, having a locking surface for pressing the nut parts against the threaded rod and having a centering surface for centering the threaded rod in the passage opening,
    the locking element, in the passage opening, having a transition surface adjoining the locking surface and the centering surface, and running between the locking surface and the centering surface,
    wherein the locking surface has a smaller opening angle than the transition surface, at least in certain areas,
    wherein the nut parts each have at least one collar for engaging with the locking surface, and
    wherein the at least one collar has a contact surface to establish contact with the locking surface of the locking element, as well as a positioning surface arranged at an angle to the contact surface.

2. The fastening arrangement as recited in claim 1 wherein at least one of the locking surface, the transition surface and the centering surface are configured so as to be in the form of ring segments or a ring.

3. The fastening arrangement as recited in claim 1 wherein the quick-action nut has at least one stop surface limiting an axial insertion of the quick-action nut into the passage opening, and in that the transition surface is at a distance from the nut parts when the quick-action nut is in contact with the stop surface on the locking element and/or when the locking surface is pressing the nut parts onto the threaded rod.

4. The fastening arrangement as recited in claim 1 wherein the nut parts each have two collars arranged on opposite sides of the appertaining nut part.

5. The fastening arrangement as recited in claim 1 wherein the locking element has a slit extending into the passage opening so that the threaded rod can be inserted into the passage opening from an outside of the locking element.

6. The fastening arrangement as recited in claim 5 wherein the locking element has another passage opening to secure an additional quick-action nut with two additional nut parts on the threaded rod, the passage opening and the additional passage opening being aligned with each other.

7. The fastening arrangement as recited in claim 1 wherein both nut parts are joined to each other in an articulated manner.

8. The fastening arrangement as recited in claim 1 further comprising the threaded rod passing through the passage opening, the locking surface of the locking element pressing both nut parts radially against the threaded rod.

9. The fastening arrangement as recited in claim 1 wherein the centering surface is cylindrical.

10. The fastening arrangement as recited in claim 1 wherein the centering surface is capable of contacting the threaded rod directly.

11. The fastening arrangement as recited in claim 10 wherein the threaded rod has an outer circumferential surface, the centering surface capable of contacting the outer circumferential surface directly.

12. The fastening arrangement as recited in claim 1 wherein the centering surface faces the threaded rod.

13. The fastening arrangement as recited in claim 1 wherein the centering surface has a component parallel to an axis of the threaded rod.

14. The fastening arrangement as recited in claim 1 wherein the centering surface contacts the threaded rod directly.

15. A fastening arrangement comprising:
    a quick-action nut having two nut parts, the nut parts each having a groove to receive a threaded rod;
    a locking element, the locking element having at least one passage opening for securing the quick-action nut to the threaded rod, the locking element, in the passage opening, having a locking surface for pressing the nut parts against the threaded rod and having a centering surface for centering the threaded rod in the passage opening,
    the locking element, in the passage opening, having a transition surface adjoining the locking surface and the centering surface, and running between the locking surface and the centering surface,
    wherein the quick-action nut has at least one stop surface limiting an axial insertion of the quick-action nut into the passage opening, and in that the transition surface is at a distance from the nut parts when the quick-action nut is in contact with the stop surface on the locking element and/or when the locking surface is pressing the nut parts onto the threaded rod.

16. A fastening arrangement comprising:
a quick-action nut having two nut parts, the nut parts each having a groove to receive a threaded rod;
a locking element, the locking element having at least one passage opening for securing the quick-action nut to the threaded rod, the locking element, in the passage opening, having a locking surface for pressing the nut parts against the threaded rod and having a centering surface for centering the threaded rod in the passage opening,
the locking element, in the passage opening, having a transition surface adjoining the locking surface and the centering surface, and running between the locking surface and the centering surface,
wherein the locking element has a slit extending into the passage opening so that the threaded rod can be inserted into the passage opening from an outside of the locking element, and
wherein the locking element has another passage opening to secure an additional quick-action nut with two additional nut parts on the threaded rod, the passage opening and the additional passage opening being aligned with each other.

17. A fastening arrangement comprising:
a quick-action nut having two nut parts, the nut parts each having a groove to receive a threaded rod;
a locking element, the locking element having at least one passage opening for securing the quick-action nut to the threaded rod, the locking element, in the passage opening, having a locking surface for pressing the nut parts against the threaded rod and having a centering surface for centering the threaded rod in the passage opening,
the locking element, in the passage opening, having a transition surface adjoining the locking surface and the centering surface, and running between the locking surface and the centering surface,
wherein the nut parts each have at least one collar for engaging with the locking surface,
wherein the at least one collar has a contact surface to establish contact with the locking surface of the locking element, as well as a positioning surface arranged at an angle to the contact surface, and
wherein the nut parts each have two collars arranged on opposite sides of the appertaining nut part.

* * * * *